US005376432A

United States Patent [19]

Umise et al.

[11] Patent Number: 5,376,432

[45] Date of Patent: Dec. 27, 1994

[54] THERMAL TRANSFER SHEET

[75] Inventors: Shigeki Umise; Taro Suzuki, both of Tokyo, Japan

[73] Assignee: Dai Nippon Printing Co., Ltd., Japan

[21] Appl. No.: 800,625

[22] Filed: Nov. 27, 1991

[30] Foreign Application Priority Data

Nov. 29, 1990 [JP] Japan ........................ 2-325464

[51] Int. Cl.[5] ........................ B32B 3/00

[52] U.S. Cl. ........................ 428/195; 428/423.1; 428/484; 428/488.4; 428/913

[58] Field of Search ........................ 428/195, 484, 488.4, 428/913, 423.1

[56] References Cited

U.S. PATENT DOCUMENTS

| | | | |
|---|---|---|---|
| 4,961,997 | 10/1990 | Asano et al. | 428/423.1 |
| 4,965,239 | 10/1990 | Henzel | 503/227 |
| 4,999,335 | 3/1991 | Mruk et al. | 503/227 |

FOREIGN PATENT DOCUMENTS

| | | | |
|---|---|---|---|
| 60-174694 | 9/1985 | Japan | 428/195 |
| 60-217194 | 10/1985 | Japan | 428/195 |
| 62-299389 | 12/1987 | Japan | 428/195 |
| 63-191678 | 8/1988 | Japan | 428/195 |
| 111870 | 1/1989 | Japan | 428/195 |
| 1186380 | 7/1989 | Japan | 428/195 |
| 1208188 | 8/1989 | Japan | 428/195 |
| 24575 | 1/1990 | Japan | 428/195 |
| 225396 | 1/1990 | Japan | 428/195 |
| 239998 | 2/1990 | Japan | 428/195 |
| 247093 | 2/1990 | Japan | 428/195 |
| 247094 | 2/1990 | Japan | 428/195 |
| 247095 | 2/1990 | Japan | 428/195 |
| 263895 | 3/1990 | Japan | 428/195 |
| 2206591 | 8/1990 | Japan | 428/195 |
| 2252583 | 10/1990 | Japan | 428/195 |

*Primary Examiner*—Patrick J. Ryan
*Assistant Examiner*—Elizabeth Evans
*Attorney, Agent, or Firm*—Ladas & Parry

[57] ABSTRACT

There is used, as a substrate film, a polypropylene film having a tear strength in the range of 15 to 40 Kg with respect to an MD direction and a TD direction thereof; an elongation in the range of 40 to 200 with respect to the MD direction and the TD direction thereof; and a Young's modulus in the range of 200 to 600 Kg/mm$^2$ with respect to the MD direction and the TD direction thereof, and a transferable ink layer is formed on a surface of such a substrate film. When the resultant thermal transfer sheet having such a structure is used, a printing pressure based on a thermal head is sufficiently transmitted to a transfer receiving material, and therefore it is possible to form an image of good quality on the transfer receiving material even when the transfer receiving material comprises a plain paper having a relatively rough texture (or relatively coarse grain).

15 Claims, 1 Drawing Sheet

THERMAL TRANSFER SHEET

BACKGROUND OF THE INVENTION

The present invention relates to a thermal transfer sheet, and particularly to a thermal transfer sheet which is capable of forming an image of good quality on a transfer receiving paper even when the transfer receiving paper comprises a plain paper having a relatively rough texture (or relatively coarse grain).

Hitherto, in a case where an output from a computer, word processor, or facsimile, etc., is printed by a thermal transfer system, there has been used a thermal transfer sheet comprising a substrate film and a transferable ink layer disposed on one surface side thereof. Such a conventional thermal transfer sheet comprises a substrate film comprising a plastic film having a thickness of 3 to 20 μm such as a polyethylene terephthalate film. The above mentioned thermal transfer sheet has been prepared by coating the substrate film with a transferable ink comprising a wax and a colorant such as a dye or a pigment mixed therein, to form a transferable ink layer on the substrate film (Japanese Laid Open Patent Application (JP A, KOKAI), 207682/1988, etc.).

However, the conventional thermal transfer sheet as described above has some disadvantages. One of these disadvantages is such that when an image is intended to be formed on a transfer receiving paper having a relatively rough texture, such as plain paper and regenerated paper, by use of such a thermal transfer sheet, the polyethylene terephthalate film has too high a strength and the printing pressure based on a thermal head used for the thermal transfer operation is not sufficiently transmitting to the concavities (or indentations) of the transfer receiving paper. As a result, there has been posed a problem such that the ink is not sufficiently transferred to the transfer receiving paper so that an image having a lot of so-called dropouts or image defects is provided, and therefore an iamge of high quality cannot be formed.

For the purpose of solving such a problem, these nave been made various proposals. For example, there has been proposed a method wherein the texture (or again) of a paper to be subjected to a recording operation is covered with a transferable ink by increasing the amount of the transfeable ink. However, when such a method is used, the thermal transfer sheet to be used for such a purpose is inevitably caused to have a large thickness so that the sensitivity thereof may be lowered. In order to solve such a problem, there has been proposed a method wherein the substrate film constituting the thermal transfer sheet is caused to have a smaller thickness so as to improve the sensitivity thereof and to obtain a proper sensitivity. In such a case, however, a polyethylene terephthalate film may generally have a poor thermal stability and may pose a problem such that a crease is liable to occur. Accordingly, it is necessary to improve such a film, and there have been made various proposals for the purpose of solving the above problems (e.g., Japanese Laid-Open Patent Application (JP-A, KOKAI) Nos. 104393/1985; 207682/1988; 39374/1988; 193889/1987; 191679/1988; etc.). However, when any of these methods is used, the resultant polyethylene terephthalate film has smaller thickness. Therefore it is necessary to treat such a film so that the resultant film may have a excellent sticking prevention property in consideration of excessive energy supplied thereto from a thermal head. As a result, the production cost in such case is increased. In addition, since the thickness of the transferable ink layer becomes larger, the improvement in the sharpness of the resultant printed image inevitably has a certain limit.

In addition, there has also been posed another problem such that since a polyester film having a high strength is used as the substrate film of a thermal transfer sheet, the used thermal transfer sheet is not sufficiently cut or shredded by means of a shredder so as to cause a trouble of the shredder, when the thermal transfer sheet is intended to be shredded by means of the shredder for the purpose of preventing the leakage of the secret based on the used thermal trasnfer sheet.

SUMMARY OF THE INVENTION

Accordingly, an object of the present invention is to provide a thermal transfer sheet which is capable of forming an image of good quality on a transfer receiving paper, even when the transfer receiving paper comprises a plain paper having a relatively rough texture (or relatively coarse grain) .

According to the present invention, there is provided a thermal transfer sheet comprising a polypropylene film as a substrate film, and a transferable ink layer disposed on a surface of the polypropylene film, wherein the polypropylene film has a tear strength in the range of 15 to 40 Kg with respect to an MD direction and a TD direction thereof; an elongation in the range of 40 to 200 with respect to the MD direction and the TD direction thereof; and a Young's modulus in the range of 200 to 600 $Kg/mm^2$ with respect to the MD direction and the TD direction thereof.

According to the above thermal transfer sheet, a printing pressure based on a thermal head is sufficiently transmitted to a transfer receiving material, and therefore it is possible to form an image of good quality on the transfer receiving material even when the transfer receiving material comprises a plain paper having a relatively rough texture (or relatively coarse grain).

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

Hereinbelow, the present invention is specifically described with reference to the accompanying drawings.

Figure 1:
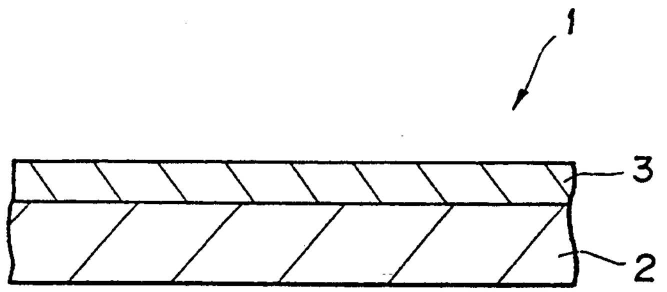
FIG. 1 is a schematic sectional view showing an embodiment of the present invention.

FIG. 1 is a schematic sectional view showing an embodiment of the thermal trasnfer sheet according to the present invention. As shown in FIG. 1, a thermal transfer sheet 1 comprises a substrate film (or base film) 2 and a transferable ink layer disposed on a surface of the substrate film 2.

In the thermal transfer sheet 1 according to the present invention, the substrate film 2 to be used for such a purpose may be the same as that used in a conventional thermal transfer sheet except that it comprises a polypropylene film having a specific physical property. Such a substrate film is not particularly restricted as long as it has a specific physical property which will be specifically described hereinbelow.

The polypropylene film to be used as the substrate film in the present invention comprises a polypropylene film which has a tear strength (or tear propagation strength) of 15 to 40 Kg in an MD direction (or machine direction) and 15 to 40 Kg in a TD direction (or transverse direction); an elongation (or elongation percentage) of 40 to 200 in the MD direction and 40 to 200 in the MD direction; and Young's modulus of 200 to 600 $Kg/mm^2$ in the MD direction and 200 to 600 $Kg/mm^2$ in the TD direction. If the tear strength is below the above range, the strength of the substrate film becomes insufficient and it may cause a trouble of a printer to be used in combination With the thermal transfer sheet at the time of the use thereof. On the other hand, the strength of the substrate film exceeds the above range, the film becomes harder and the printing pressure based on the thermal head is not sufficiently transmitted to the paper. In addition, in such a case, it is difficult to shred the used thermal trasnfer sheet by means of a shredder. If the elongation is below the above range, the printing pressure based on the thermal head is not sufficiently transmitted to the paper in the same manner as described above. On the other hand, if the elongation exceeds the above range, the resolution of the resultant printed image is decreased. The above substrate film may preferably have a thickness of 3 to 7 μm.

In addition, in a preferred embodiment of the present invention wherein at least one surface side of the above polypropylene film is subjected to a corona treatment (or corona discharge treatment), the adhesion property between the polypropylene film and a back coating layer (and/or a transferable ink layer) which will be specifically described hereinbelow is improved. In such a case, it is possible to adopt a conventional method known in the art for the purpose of the corona treatment. An untreated polypropylene film may generally have a surface tension of 30 dyne/cm. In the present invention, when the treated surface of the film is caused to have a surface tension in the range of 35 dyne/cm or above, the adhesion property between the polypropylene film and a back coating layer (and/or a transferable ink layer) is improved and therefore it is possible to effectively prevent powder or film fragment constituting such a layer being dropped from the thermal transfer sheet.

Further, when both surface sides of the polypropylene film are subjected to a corona discharge treatment, the resultant polypropylene film per se may easily cause considerable blocking thereof. Therefore, in such a case, it is preferred to mat at least one side surface of the film so as to impart thereto unevenness (or convexities and concavities) corresponding to about 0.1 to 0.5 μm in terms of Ra which means the height of the convexity or the depth of the concavity counted from the center line of the unevenness (i.e., convexities and concavities). It is possible to effect such a matting treatment either before or after the corona discharge treatment of the film.

Further, in a case where a surface side of the polypropylene film on which the transferable ink layer 3 is to be formed is subjected to such a matting treatment, it is preferred to effect such a treatment so as to provide an Sm (i.e., mean interval between the convexities) of 350 μm or below. In such a case, it is possible to obtain a good blocking prevention effect and to obtain a printed image having a good matted state. As a matter of course, even when the above corona discharge treatment is not effected or only one surface side of the film is corona treated, it is possible to effect the matting treatment for the purpose of obtaining such a matted printed image.

Herein, the surface unevenness of the mat-treated polypropylene film may be measured by use of a method according to JIS B0601 (1982) by means of a contact finger (or feeler) type surface roughness meter (three dimensional surface roughness configuration measurement device, Surfcam 570A-3DF, mfd. by Tokyo Seimitsu K.K.) according to JIS B0651(1976).

In such a case the contact finger comprises a diamond conic member and has an angle between the opposite faces of 90 degrees, and a radius of curvature of 5 μm at the tip thereof. In an average position of the contact finger, the measurement force is 0.4 gf or below. In this measurement, it is possible to use a cut off value of 0.8 mm and a measurement length of 3.0 mm.

In the present invention, the transferable ink layer 3 may comprise an ink comprising a colorant and a vehicle and an optional additive to be mixed therewith, as desired.

The colorant may preferably be one having a good recording property as a recording material, which is selected from organic or inorganic dyes or pigments. For example, the colorant may preferably be one having a sufficient coloring density (or coloring power) and is not substantially faded or color changed due to light, heat, temperature, etc.

The colorant can also comprise a substance such that it is colorless under no heating, and develops a color when it is heated or it contacts another substance which has been applied onto a transfer receiving material. The colorant may be one capable of providing various colors inclusive of cyan, magenta, yellow, and black.

The vehicle may predominantly comprise a wax or may comprise a mixture of a wax and another component such as drying oil, resin, mineral oil, and derivatives of cellulose and rubber.

Representative examples of the wax may include: microcrystalline wax, carnauba wax, paraffin wax, etc. In addition, specific examples of the wax may include; various species thereof such as Fischer-Tropsh wax, various low-molecular weight polyethylene, Japan wax, beeswax, whale wax, insect wax, lanolin, shellac wax, candelilla wax, petrolactam, partially modified wax, fatty acid ester, and fatty acid amide.

In order to impart good heat conductivity arid melt-transferability to the transferable ink layer 3, a heat-conducting substance can also be incorporated into the heat-fusible ink. Specific examples of such a heat conducting substance may include; carbon substances such as carbon black; and aluminum,copper, tin oxide, and molybdenum disulfide, etc. The thickness of the transferable ink layer 3to be formed on the substrate film 2 should be determined so that the requisite image density and thermal sensitivity are balanced with each other. For example, the thickness may preferably be about in the range of 2 to 7 μm, when the thermal transfer sheet is one such that it is once used for printing and then is disposed. On the other hand, the thickness may preferably be in the range of about 5 to 20 μm when the thermal transfer sheet is one such that it is used for the printing plural times and then is disposed.

Figure 2:
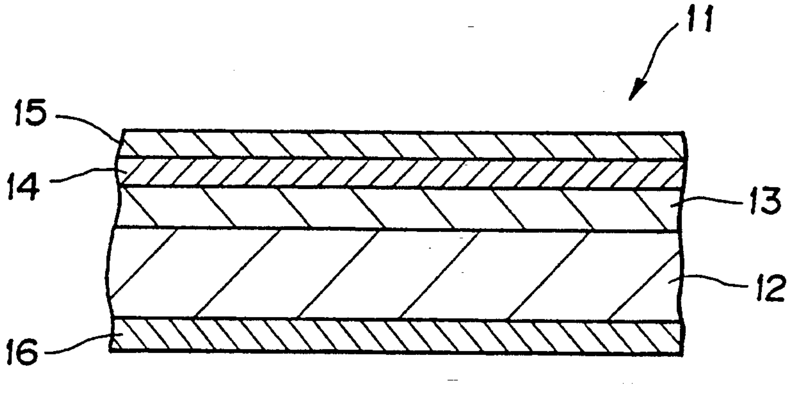
FIG. 2 is a schematic sectional view showing another embodiment of the thermal transfer sheet according to the present invention.

FIG. 2 is a schematic sectional view showing another embodiment of the thermal transfer sheet according to the present invention. As shown in FIG. 2, a thermal transfer sheet 11 comprises a substrate film 12 and a transferable ink layer 13, a heat-sensitive adhesive layer 14 and a sealing layer 15 disposed in the order named on the surface of the substrate film 12; and a back coating layer 16 disposed on the back surface of the substrate film 12. The substrate film 12 and the transferable ink layer 13 may be the same as the substrate film 2 and the transferable ink layer 3, respectively used in the embodiment as described hereinbefore, and the detailed description thereof is omitted.

The heat-sensitive adhesive layer 14 to be formed on the transferable ink layer 13 may be formed by use of a heat-sensitive adhesive, i.e., a thermoplastic resin having a relatively low melting point. Specific examples thereof may include resins having a melt viscosity which higher than that of the vehicle used for the formation of the above transferable ink layer 13, such as ethylene-vinyl acetate copolymer (EVA), ethylene-acrylic acid ester copolymer (EEA), polybutene, petroleum resin, vinyl chloride-vinyl acetate copolymer and polyvinyl acetate. It is also possible to color the heat sensitive adhesive layer 14 in the same manner as in the case of the transferable ink layer. The thus formed heat-sensitive adhesive layer 14 may for example have a thickness of about 0.5 to 2 μm. Such a heat sensitive adhesive layer 14 may preferably have a melt viscosity in the range of 15 to 1,200 in terms of melt index.

In order to form the transferable ink layer 13 end the heat sensitive adhesive layer 14, there may be used various methods such as hot-lacquer coating, gravure coating, gravure reverse coating, roll coating, etc., in addition to hot-melt coating.

The sealing layer 15 to be formed on the above heat-sensitive adhesive layer 14 may seal the rough surface of a transfer receiving material at the time of the printing operation based on the above transferable ink layer 13.

The above sealing layer 15 may be formed by use of a method which is the same as that used for the formation of the above transferable ink layer 13 and the heat-sensitive adhesive layer 14, or may also be formed by use of a method using an aqueous emulsion containing a wax. For example, when an aqueous emulsion containing a wax is applied onto the heat-sensitive adhesive layer 14 and the resultant coating is dried at a temperature which is lower than the melting point of the wax, the sealing layer 15 may be formed while the wax contained therein retains its particulate form.

In the present invention, the sealing layer 15 to be formed in the above manner may preferably have a thickness of not less than 0.1 μm and less than 5 μm so that the resultant sensitivity does not become insufficient even when the printing energy to relatively low as in the case of a high-speed type printer. Such a sealing layer 15 may preferably have a melt viscosity in the range of 5 to 40 cps at 100° C.

Since the above polypropylene film to be used as the substrate film may have a relatively low heat resistance, the back coating layer 16 may be formed for the purpose or improving the sliding property with respect to the thermal head and preventing the sticking thereof. Accordingly, the back coating 16 layer may preferably be one having a heat resistance. The back coating layer 16 comprises a resin having a heat resistance and a substance capable of functioning as a thermal release agent (or thermal parting agent) or a lubricating agent, as basic constituents. When such a back coating layer 16 is provided, it is possible to effect thermal printing without causing the sticking even in the case of a thermal transfer sheet using a plastic film having a low heat resistance as a substrate thereof. Accordingly, in such a case, it is possible to effectively utilize the advantage of a plastic film such that it is difficult to be cut or broken, and it is easy to be processed or machined.

As a matter of course, the present invention is also applicable to a thermal transfer sheet to be used for color image formation, and therefore a thermal transfer sheet capable of providing a multi color-image is also within the scope of the present invention. In addition, the thermal transfer sheet according to the present invention is applicable to any of a line type thermal transfer printer, and a serial type thermal transfer printer.

Hereinbelow, the thermal transfer sheet according to the present invention is described in more detail with reference to Experimental Examples and Comparative Examples. In the description appearing hereinafter, "part(s)" and "%" are "part(s) by weight" and "wt. %", respectively, unless otherwise noted specifically.

EXPERIMENT EXAMPLE 1

An ink composition for a transferable ink having the following composition was melt kneaded by means of a blade kneader for 6 hours while being heated up to 90° C.

| Ink composition for forming transferable ink layer | |
|---|---|
| Paraffin wax | 8 parts |
| Carnauba wax | 2 parts |
| Ethylene/vinyl acetate copolymer | 1 part |
| Carbon black | 2 parts |

Then, the ink composition preapred above was heated up to 100° C. and applied onto a surface of a 3.8 μm-thick polypropylene film (trade name: Torayfan 4D, mfd. by Toray K.K.) by use of a roller coating method using the resultant hot melt so as to provide a coating amount of about 4 g,/m$^2$, thereby to form a transferable ink layer. The thus prepared transferable ink layer had a melt viscosity of 100 cps at 100° C.

Then, a coating liquid having the following composition was applied onto the surface of the above transferable ink layer in the same manner as described above so as to provide a coating amount of 1 g/m$^2$, thereby to form a heat-sensitive adhesive layer. The thus prepared heat-sensitive adhesive layer had a melt index of 400.

| | |
|---|---|
| Ethylene/vinyl acetate copolymer (trade name: Everflex 410) | 8 parts |
| Carbon black | 2 parts |

Then, carnauba wax was applied onto the surface of the above heat-sensitive adhesive layer so as to provide a coating amount of 0.5 g/m$^2$ to form a sealing layer, whereby a thermal transfer sheet according to the present invention was obtained. The above sealing layer had a melt viscosity of 28 cps at 100° C.

EXPERIMENT EXAMPLE 2

A thermal transfer sheet according to the present invention was prepared in the same manner as in Experiment Example 1 except that a 4.3 μm-thick polypropylene film (trade name: Torayfan 4X, mfd. by ToFay K.K.) was used instead of the polypropylene film used in Experiment Example 1.

EXPERIMENT EXAMPLE 3

A thermal transfer sheet according to the present invention was prepared in the same manner as in Experiment Example 1 except that a 5.8 μm-thick polypropylene film (trade name: Torayfan 6D, mfd. by Toray K.K.) was used instead of the polypropylene film used in Experiment Example 1.

The polypropylene films used in the above Experiment Examples had physical properties shown in the following Table 1.

TABLE 1

| Trade name | Tear strength (kg) MD | Tear strength (kg) TD | Elongation MD | Elongation TD | Young's modulus (kg/mm$^2$) MD | Young's modulus (kg/mm$^2$) TD |
|---|---|---|---|---|---|---|
| I | 20 | 35 | 180 | 60 | 240 | 480 |
| II | 18.8 | 34.9 | 156 | 51 | 250 | 490 |
| III | 20 | 35 | 190 | 60 | 240 | 480 |

I: Torayfan 4D, II: Torayfan 4X, III: Torayfan 6D

EXPERIMENT EXAMPLE 4

A thermal transfer sheet according to the present invention was prepared in the same manner as in Experiment Example 2 except that Torayfan 4X wherein a surface thereof on which the transferable ink layer was to be formed had been subjected to a corona discharge treatment so as to provide a surface tension of 36 dyne/cm was used instead of the polypropylene film used in Experiment Example 2.

EXPERIMENT EXAMPLE 5

A thermal transfer sheet according to the present invention was prepared in the same manner as in Experiment Example 3 except that Torayfan 6D wherein a surface thereof on which the transferable ink layer was to be formed had been subjected to a corona discharge treatment so as to provide a surface tension of 36 dyne/cm was used instead of the polypropylene film used in Experiment Example 3.

EXPERIMENT EXAMPLE 6

A thermal transfer sheet according to the present invention was prepared in the same manner as in Experiment Example 1 except that Torayfan 4D wherein both surfaces thereof had been subjected to a corona discharge treatment so as to provide a surface tension of 36 dyen/cm and a surface thereof on which the transferable ink layer was to be formed had been matted so as to impart thereto an unevenness of about 0.3 μm, and the back surface thereof had been provided with a back coating layer comprising a polyurethane resin and a lubricating agent was used instead of the polypropylene film used in Experiment Example 1.

EXPERIMENT EXAMPLE 7

A thermal transfer sheet according to the present invention was prepared in the same manner as in Experiment Example 6 except that the matting treatment used in Experiment Example 6 was effected so as to provide a mean convexity interval Sm of about 200 μm.

EXPERIMENT EXAMPLE 8

A thermal transfer sheet according to the present invention was prepared in the same manner as in Experiment Example 6 except that the matting treatment used in Experiment Example 6 was effected so as to provide a mean convexity interval Sm of about 340 μm.

COMPARATIVE EXAMPLE 1

A thermal transfer sheet of Comparative Example was prepared in the same manner as in Experiment Example 1 except that a 4.5 μm-thick polyester film (trade name: F53, mfd. by Toray K.K.) was used instead of the substrate film used in Experiment Example 1.

COMPARATIVE EXAMPLE 2

A thermal transfer sheet of Comparative Example was prepared in the same manner as in Experiment Example 6 except that a 4.5 μm-thick polyester film (trade name: F53, mfd. by Toray K.K.) was used instead of the substrate film used in Experiment Example 6.

COMPARATIVE EXAMPLE 3

A thermal transfer sheet of Comparative Example was prepared in the same manner as in Experiment Example 6 except that the matting treatment used in Experiment Example 6 was effected so as to provide a mean convexity interval Sm of about 390 μm.

EVALUATION EXAMPLE 1

By use of each of the thermal transfer sheets of Experiment Example 1 to 3 and Comparative Example 1 prepared above, printing was effected under the following printing conditions and the image quality of the resultant images was evaluated. The thus obtained results are shown in the following Table 2.

Printing conditions

Equipment used: A simulator (mfd. by Toshiba K.K.) equipped with a thin film type thermal head.

Printing energy: 0.8 mJ/dot (constant)

Transfer receiving material: four species of plain papers having a Bekk smoothness of 20, 25,30 and 40 sec, respectively.

TABLE 2

| Thermal transfer sheet | Image quality Bekk smoothness (sec.) 20 | 25 | 30 | 50 |
|---|---|---|---|---|
| Experiment Example 1 | ○ | ○ | ○ | ○ |
| Experiment Example 2 | ○ | ○ | ○ | ○ |
| Experiment Example 3 | ○ | ○ | ○ | ○ |
| Comp. Example 1 | X | X~Δ | X~Δ | Δ~○ |

Standard of Evaluation

The above images were evaluated by observing an image defect included therein with the naked eye.

○: No image defect was observed.

Δ: Image defects were partially observed.

X: Image defects were observed in the entirety of the image.

EVALUATION EXAMPLE 2

The adhesion properties of the ink layer and the back coating layer with respect to the substrate film were evaluated with respect to each of the thermal transfer sheets of Experiment Examples 4 to 6, and Comparative Example 2. The thus obtained results are shown in the following Table 3. Incidentally, in Experiment Example 6, the polypropylene film did not cause blocking at the step of the preparation of the thermal transfer sheet.

TABLE 3

| Thermal transfer | Adhesion property | |
|---|---|---|
| sheet | Ink layer | Back coating layer |
| Experiment Example 4 | Good | — |
| Experiment Example 5 | Good | — |
| Experiment Example 6 | Good | Good |
| Comp. Example 2 | Not good | Not good |

EVALUATION EXAMPLE 3

By use of each of the thermal transfer sheets of Experiment Example 7 to 8 and Comparative Example 3 prepared above, printing was effected under the same printing conditions as in the above Evaluation Example 1 and the image quality of the resultant images was evaluated. The thus obtained results are shown in the following Table 4.

TABLE 4

| Thermal transfer sheet | Matted state of printed image |
|---|---|
| Experiment Example 7 | ○ |
| Experiment Example 8 | Δ |
| Comp. Example 3 | X |

Evaluation standard
○: good matted state
Δ: matted state
X: mirrored state

What is claimed is:

1. A thermal transfer sheet comprising a polypropylene film as a substrate film, and a transferable ink layer disposed on a surface of the polypropylene film,
   wherein the polypropylene film is oriented so as to have a tear strength in the range of 15 to 40 kg with respect to an MD direction and a TD direction thereof; an elongation in the range of 40 to 200 with respect to the MD direction and the TD direction thereof; and a Young's modulus in the range of 200 to 600 kg/mm$^2$ with respect to the MD direction and the TD direction thereof.

2. The thermal transfer sheet according to claim 1, wherein the polypropylene film has a back surface which has been subjected to a corona discharge treatment.

3. The thermal transfer sheet according to claim 2, wherein the surface of the polypropylene film which has been subjected to the corona discharge treatment has a surface tension in the range of 35 to 40 dyne/cm.

4. The thermal transfer sheet according to claim 2, which further comprises a back coating layer disposed on the back surface of the polypropylene film.

5. The thermal transfer sheet according to claim 1, which further comprises a heat-sensitive adhesive layer disposed on the transferable ink layer.

6. The thermal transfer sheet according to claim 5, which further comprises a sealing layer disposed on the heat-sensitive adhesive layer.

7. The thermal transfer sheet according to claim 1, wherein the polypropylene film has a surface which has been subjected to a matting treatment, and the mat treated surface has a unevenness corresponding to a mean convexity interval (Sm) of 350 μm or below.

8. The thermal transfer sheet according to claim 1, wherein the polypropylene film has both surfaces which have been subjected to a corona discharge treatment.

9. The thermal transfer sheet according to claim 8, wherein the surfaces of the polypropylene film which have been subjected to the corona discharge treatment have a surface tension in the range of 35 to 40 dyne/cm.

10. The thermal transfer sheet according to claim 8, wherein at least one surface of the polypropylene film has been subjected to a matting treatment.

11. The thermal transfer sheet according to claim 10, wherein the mat treated surface has an unevenness of about 0.1 to 0.5 μm.

12. The thermal transfer sheet according, to claim 10, wherein the mat treated surface has an unevenness corresponding to a mean convexity interval (Sm) of 350 μm or below.

13. The thermal transfer sheet according to claim 8, which further comprises a back coating layer disposed on a back surface of the polypropylene film.

14. The thermal transfer sheet according to claim 13, which further comprises a heat-sensitive adhesive layer disposed on the transferable ink layer.

15. The thermal transfer sheet according to claim 14, which further comprises a sealing layer disposed on the heat-sensitive adhesive layer.

* * * * *

UNITED STATES PATENT AND TRADEMARK OFFICE
CERTIFICATE OF CORRECTION

PATENT NO. : 5,376,432

DATED : December 27, 1994

INVENTOR(S) : Shigeki Umise et al

It is certified that error appears in the above—identified patent and that said Letters Patent is hereby corrected as shown below:

| | |
|---|---|
| In column 1, line 34 | delete "transmitting" and substitute --transmitted-- therefore; |
| line 39 | delete "iamge" and substitute --image-- therefore; |
| line 46 | delete "transfeable" and substitute --transferable-- therefore; |
| In column 2, line 13 | delete "trasnfer" and substitute --transfer-- therefore; |
| line 60 | delete "trasnfer" and substitute --transfer-- therefore; |
| In column 3, line 23 | delete "trasnfer" and substitute --transfer-- therefore; |
| In column 6, line 37 | delete "preapred" and substitute --prepared-- therefore; |
| after line 50 | insert --Composition of coating liquid for heat-sensitive adhesive layer.--; |

UNITED STATES PATENT AND TRADEMARK OFFICE

CERTIFICATE OF CORRECTION

PATENT NO. : 5,376,432

DATED : December 27, 1994

INVENTOR(S) : Shigeki Unise et al

It is certified that error appears in the above-indentified patent and that said Letters Patent is hereby corrected as shown below:

line 68 delete "ToFay" and substitute --Toray-- therefore;

Signed and Sealed this

Second Day of May, 1995

Attest:

BRUCE LEHMAN

Attesting Officer

Commissioner of Patents and Trademarks